United States Patent
Hong et al.

(10) Patent No.: US 9,779,730 B2
(45) Date of Patent: Oct. 3, 2017

(54) METHOD AND APPARATUS FOR SPEECH RECOGNITION AND GENERATION OF SPEECH RECOGNITION ENGINE

(71) Applicant: Samsung Electronics Co., Ltd., Suwon-si (KR)

(72) Inventors: Seok Jin Hong, Hwaseong-si (KR); Young Sang Choi, Seongnam-si (KR); Hee Youl Choi, Hwaseong-si (KR); Sang Hyun Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/614,582

(22) Filed: Feb. 5, 2015

(65) Prior Publication Data

US 2016/0027437 A1    Jan. 28, 2016

(30) Foreign Application Priority Data

Jul. 28, 2014    (KR) ........................ 10-2014-0095870

(51) Int. Cl.
*G10L 15/08*    (2006.01)
*G10L 15/187*    (2013.01)

(52) U.S. Cl.
CPC .................. *G10L 15/187* (2013.01)

(58) Field of Classification Search
None
See application file for complete search history.

(56) References Cited

U.S. PATENT DOCUMENTS

| | | | |
|---|---|---|---|
| 7,260,531 B2 | 8/2007 | Kosaka et al. | |
| 8,612,212 B2 | 12/2013 | Riccardi | |
| 2012/0065976 A1 | 3/2012 | Deng et al. | |
| 2013/0275117 A1* | 10/2013 | Winer | G06F 17/2863 704/3 |
| 2014/0303973 A1* | 10/2014 | Amarilli | G10L 15/08 704/235 |
| 2015/0161985 A1* | 6/2015 | Peng | G10L 15/26 704/235 |
| 2015/0255060 A1* | 9/2015 | Tomita | G10L 15/02 704/254 |
| 2015/0294666 A1* | 10/2015 | Miyasaka | G10L 21/0208 704/251 |

FOREIGN PATENT DOCUMENTS

| | | |
|---|---|---|
| KR | 10-2011-0029471 A | 3/2011 |
| KR | 10-2013-0128329 A | 11/2013 |

* cited by examiner

*Primary Examiner* — Qian Yang
(74) *Attorney, Agent, or Firm* — NSIP Law

(57) ABSTRACT

A method and apparatus for speech recognition and for generation of speech recognition engine, and a speech recognition engine are provided. The method of speech recognition involves receiving a speech input, transmitting the speech input to a speech recognition engine, and receiving a speech recognition result from the speech recognition engine, in which the speech recognition engine obtains a phoneme sequence from the speech input and provides the speech recognition result based on a phonetic distance of the phoneme sequence.

19 Claims, 9 Drawing Sheets

METHOD AND APPARATUS FOR SPEECH RECOGNITION AND GENERATION OF SPEECH RECOGNITION ENGINE

CROSS-REFERENCE TO RELATED APPLICATION

This application claims the benefit under 35 USC 119(a) of Korean Patent Application No. 10-2014-0095870 filed on Jul. 28, 2014, in the Korean Intellectual Property Office, the entire disclosure of which is incorporated herein by reference for all purposes.

BACKGROUND

1. Field

The following description relates to technology for recognizing a speech based on pronunciation similarity, an apparatus and method for recognizing speech based on pronunciation distances, an apparatus and method for generating a speech recognition engine, and a speech recognition engine obtained by such a method.

2. Description of Related Art

With the widespread use of digital devices, various forms of user interfaces have been proposed to allow users to operate such devices. For example, a flat panel display combined with a capacitive touch interface is widely used as a representative user interface that allows users to operate a variety of personal smart devices, such as smart phones and tablet personal computers (PCs).

A user may find a touch interface to be intuitive as the user may immediately receive a feedback on a command chosen by the user. However, the touch interface may not be easy to use under certain circumstances. For example, it is difficult to use a touch interface when both hands of the user are occupied, when a complicated command needs to be executed, when multi-step interactions are required to perform a command, or when a long text needs to be input.

A speech interface may be natural to the user and intuitive, potentially compensating for flaws found in touch interfaces. Thus, the use of speech interface is desirable in a wider range of applications such as, for example, controlling devices while driving a vehicle or using voice assistance for smart devices.

However, known speech interfaces suffer from inaccuracy. Because the accuracy of speech recognition is considered an important issue for developing speech interfaces, various methods have been proposed to increase the degree of accuracy of speech recognition.

While a recurrent deep neural network (RDNN) based speech recognition technology has been proposed as a method to improve accuracy of speech recognition, several challenges exist in wide-spread application.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of speech recognition, the method involving receiving a speech input, transmitting the speech input to a speech recognition engine, and receiving a speech recognition result from the speech recognition engine, in which the speech recognition engine is configured to obtain a phoneme sequence from the speech input and provide the speech recognition result based on a phonetic distance of the phoneme sequence.

The speech recognition engine may be configured to provide the speech recognition result based on a phoneme sequence mapped to an embedding vector closest in the phonetic distance to the obtained phoneme sequence among embedding vectors arranged on an N-dimensional embedding space.

The speech recognition engine may include an inter-word distance matrix indicating phonetic distances between words determined based on phonetic similarities between phoneme sequences of the words.

The speech recognition engine may include embedding vectors arranged on an N-dimensional embedding space obtained by applying a multidimensional scaling method to an inter-word distance matrix.

In another general aspect, there is provided a method of generating speech recognition engine, the method involving obtaining phoneme sequences of words, determining phonetic similarities between the phoneme sequences by comparing phonemes comprised in the phoneme sequences, calculating phonetic distances between the words based on the determined phonetic similarities between the phoneme sequences, and generating embedding vectors based on the calculated phonetic distances between the words.

The calculating may involve assigning values to phonetic distances such that, when a phonetic similarity between phoneme sequences is large, a phonetic distance between words corresponding to the phoneme sequences is small.

The determining may involve calculating a substitution probability between phonemes comprised in the phoneme sequences, and determining the phonetic similarities between the phoneme sequences to be high when the calculated substitution probability between the phonemes is high.

The generating may involve generating an embedding vector by applying a multidimensional scaling method to an inter-word distance matrix indicating phonetic distances between the words.

The calculating may involve calculating a phonetic distance between words using a calculating method based on a phonetic distance between phonemes obtained by comparing the phonemes comprised in the phoneme sequences.

The generating may involve predicting a word using the embedding vectors generated by applying a multidimensional scaling method to the inter-word distance matrix.

In another general aspect, there is provided a method of speech recognition, the method involving receiving a speech input, obtaining a phoneme sequence from the speech input, selecting an embedding vector closest in a phonetic distance to the phoneme sequence among embedding vectors arranged on an N-dimensional embedding space, and outputting a speech recognition result based on a phoneme sequence mapped to the selected embedding vector.

The embedding vectors arranged on the N-dimensional embedding space may be generated based on phonetic distances between words determined based on phonetic similarities between phoneme sequences of the words.

The embedding vectors may be generated by applying a multidimensional scaling method to an inter-word distance matrix indicating phonetic distances between words.

In another general aspect, there is provided an apparatus including a microphone configured to receive a speech input, a phoneme sequence processor configured to obtain a phoneme sequence from the speech input, and a speech recognition engine configured to generate a speech recognition result based on a phonetic distance of the phoneme sequence.

The general aspect of the apparatus may further include a command recognition unit configured to provide a speech command interface based on the speech recognition result.

The speech recognition engine may include an inter-word distance matrix stored in a memory.

The speech recognition engine may include an embedded vector processor configured to select an embedding vector corresponding to the phoneme sequence among embedding vectors arranged on an embedding space.

In another general aspect, there is provided a speech recognition engine including an embedded vector processor configured to select an embedding vector corresponding to a phoneme sequence among embedding vectors arranged on an embedding space, and a speech recognition result synthesizer configured to recognize a word in the speech input based on the selected embedding vector.

The general aspect of the speech recognition engine may further include an inter-word distance matrix stored in a memory.

The general aspect of the speech recognition engine may further include a phoneme sequence processor configured to parse a speech input to obtain the phoneme sequence.

Other features and aspects will be apparent from the following detailed description, the drawings, and the claims.

Figure 1A:
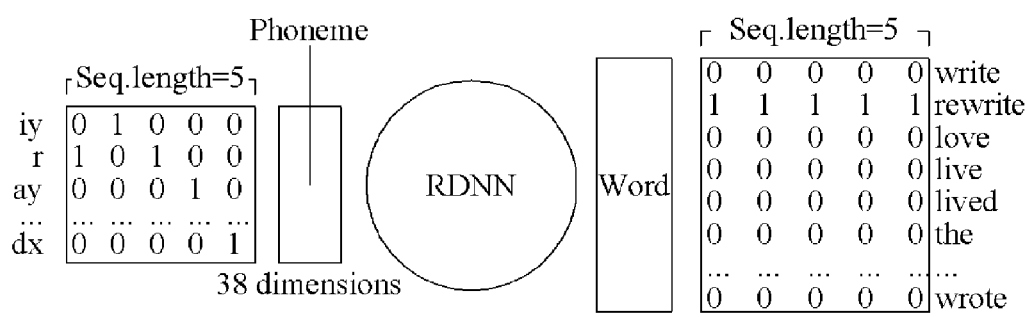
FIG. 1A is a diagram illustrating an example of an acoustic embedding based word recognition network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A recurrent deep neural network (RDNN) may be applied to speech recognition to improve the accuracy of speech recognition. Improved accuracy of speech recognition may enable the development of a robust speech interface. A recurrent deep neural network involves constructing a speech recognition engine through training. In the training, a quantity of training data and a number of training repetitions may have a great influence on the speech recognition performance. Thus, a method for reducing the amount of time used for training and the quantity of data needed for proper training to develop a speech recognition engine is desirable.

Figure 1B:
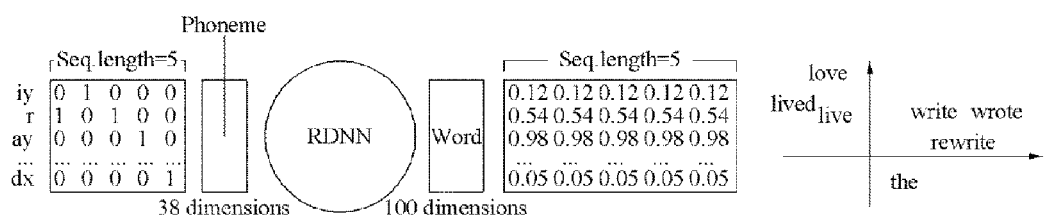
FIG. 1B is a diagram illustrating an example of an acoustic embedding based word recognition network.

FIGS. 1A and 1B are diagrams illustrating examples of acoustic embedding based word recognition networks. The word recognition networks illustrated use recurrent deep neural networks based on acoustic models. Deep learning refers to a set of procedures in machine learning that models high-level abstractions in data by using model architectures. A deep neural network is an artificial neural network with multiple hidden layers of units between the input and output layers. While some deep neural networks are designed as feed forward networks, others are designed as recurrent neural networks. A recurrent neural network is a class of artificial neural network in which connections between units form a directed cycle. A recurrent neural network may use an internal memory to process arbitrary sequences of inputs. A recurrent deep neural network is an artificial neural network providing multiple hidden layers of units in which connections between units from a directed cycle, and in which a quantity of training data and a number of training repetition influences the learning.

A speech recognition apparatus to be described hereinafter refers to an apparatus providing a speech recognition service through a speech recognition engine. The speech recognition apparatus may include a speech recognition server. The speech recognition apparatus may refer to, for example, a smartphone, a portable terminal such as a personal digital assistant (PDA), a wearable device attachable to or detachable from a body of a user, and a terminal including various speech command systems.

The terminal including the speech command systems may be, for example, a vehicle including a smart television (TV) and a speech command system. However, the speech recognition apparatus may not be limited to the foregoing examples, but include all terminals including a speech command system.

Referring to FIGS. 1A and 1B, a speech recognition network based on a recurrent deep neural network (RDNN) is illustrated. The recurrent deep neural network may be included in an example of a speech recognition apparatus. Alternatively, a speech recognition engine provided through the recurrent deep neural network may be included in the speech recognition apparatus.

The recurrent deep neural network may generate the speech recognition engine by learning all words using pairs of words and corresponding phoneme sequences as training data. That is, the recurrent deep neural network may predict a word corresponding to a phoneme sequence input by a user using the speech recognition engine.

The speech recognition apparatus and the speech recognition engine may be disposed in an identical apparatus and designed as a single module. For example, the speech recognition apparatus and the speech recognition engine may be disposed in a mobile terminal that detects the presence of a user command in a speech input from a user. In another example, the mobile terminal may be configured to be further trained by the speech input of a user to improve the accuracy of speech recognition. Alternatively, the mobile terminal may include a speech recognition engine that includes a speech recognition model built in advance by a training that has been performed in advance. In yet another example, the speech recognition engine may be disposed in another apparatus separate from the speech recognition apparatus. The speech recognition apparatus may provide a speech recognition service by interworking with the speech recognition engine. The speech recognition engine may include one or more memory and computer processor.

For example, the speech recognition apparatus may transmit, to the speech recognition engine, a speech input received from a user through a speech recognition sensor. In response to the transmission of the speech input, the speech recognition engine may output a speech recognition result corresponding to the speech input and transmit the speech recognition result to the speech recognition apparatus. In an example, the speech recognition apparatus may interwork with the speech recognition engine through a cloud service, and may exchange the speech input and the speech recognition result.

FIG. 1A illustrates an example of a recurrent deep neural network including an output node that uses a 1-of-M method.

The 1-of-M method refers to a method of arranging one word on one dimension. That is, in a 1-of-M method, "M" words may be arranged on "M" dimensions. Here, "M" may be an integer greater than or equal to "1" (M≥1). Referring to FIG. 1A, the word "rewrite" corresponds to a second dimension and thus, "rewrite" may be expressed as an M-dimensional vector, for example, (0, 1, 0, 0, . . . , 0), based on the 1-of-M method. Accordingly, the recurrent deep neural network may include M output nodes.

However, through the 1-of-M method, training efficiency may decrease and training time may increase in response to an increase in a number of words and in a number of nodes. In addition, through the 1-of-M method, each word may be classified into an excessive number of individual classes and a relationship between words may not be expressed.

FIG. 1B illustrates an example of a recurrent deep neural network including an output node using an embedding vector. As illustrated in FIG. 1B, the recurrent deep neural network may substitute an M-dimensional vector with an N-dimensional embedding vector through the 1-of-M method. The recurrent deep neural network may recognize a multidimensional embedding space on which the embedding vector is arranged through training.

The embedding vector may refer to a vector to which a phoneme sequence of a word is mapped. The embedding vector may be expressed as a single point on the N-dimensional embedding space. Here, "N" may be greater than or equal to "1" (N≥1).

The recurrent deep neural network may arrange a greater number of words on one dimension using the embedding vector in comparison to the 1-of-M method. Thus, the recurrent deep neural network may include a fewer number of output nodes in comparison to the 1-of-M method, and express a relationship between the words.

As illustrated in FIG. 1B, the recurrent deep neural network arranges embedding vectors on a 100-dimensional embedding space. For example, the recurrent deep neural network may arrange words, for example, "love," "lived," "live," "write," "wrote," "rewrite," and "the," on one dimension using the embedding vectors. The RDNN may set individual coordinates for each embedding vector and arrange the embedding vectors on the embedding space. For example, coordinates "0.12, 0.54, 0.98, . . . , 0.05" may be set for an embedding vector to which a phoneme sequence of "rewrite" is mapped.

A method of generating an embedding vector will be schematically described hereinafter. I. Determination of Inter-Phoneme Distance Matrix A phoneme refers to a minimum sound unit that may distinguish meanings of words. A word may be made up of phonemes. A phoneme sequence refers to a sequence of phonemes included in a word.

As illustrated in FIGS. 1A and 1B, a word may be expressed as a phoneme sequence. The phoneme sequence may be expressed based on pronunciation of the word. A length of the phoneme sequence may be determined based on a number of phonemes included in the word. For example, a phoneme sequence of the word "rewrite" may be "[r iy r ay t]", and a length of the phoneme sequence of the word "rewrite" is "5" as the phoneme sequence includes five phonemes.

The speech recognition apparatus may determine a phonetic similarity by comparing phoneme sequences of all words and determine an inter-phoneme distance matrix based on a result of the determining.

The inter-phoneme distance matrix to be described hereinafter may refer to a matrix indicating a phonetic distance between phonemes. That is, the inter-phoneme distance matrix may refer to a matrix indicating a phonetic distance between each phoneme and all other phonemes. The phonetic distance between the phonemes may be determined based on a substitution probability between the phonemes.

In an example, the speech recognition apparatus may use, as the phonetic distance between the phonemes, an inverse number of the substitution probability between the phonemes or "1—substitution probability between phonemes." The substitution probability to between the phonemes to be described hereinafter may refer to a probability that a phoneme is substituted for based on pronunciation.

The speech recognition apparatus may determine the phonetic distance between the phonemes by comparing the phoneme sequences of all the words and express the phonetic distance between the phonemes as the inter-phoneme distance matrix. A method of obtaining an inter-word distance matrix based on the inter-phoneme distance matrix will be described hereinafter.

II. Obtainment of Inter-Word Distance Matrix

An inter-word distance matrix refers to a matrix indicating a phonetic distance between words. The phonetic distance between the words may refer to a phonetic distance between phoneme sequences of the words. Thus, when a substitution probability between phonemes included in a phoneme sequence increases, the phonetic distance between the words may decrease. The speech recognition apparatus may determine the phonetic distance between the words based on the substitution probability between the phonemes, or the phonetic distance between the phonemes.

In an example, the speech recognition apparatus may calculate a phonetic distance between words based on a distance calculation method that is modified from Levenshtein distance. For example, the speech recognition apparatus may more accurately calculate the phonetic distance between the words than the Levenshtein distance by using a phonetic distance between phonemes in lieu of "1" as a unit distance per character.

The speech recognition apparatus may calculate the phonetic distance between the words using the distance calculation method based on the phonetic distance between the phonemes, and express the phonetic distance between the words as a matrix. A method of generating an embedding vector based on the inter-word distance matrix will be described hereinafter.

III. Generation of embedding vector

The speech recognition apparatus may generate an embedding vector to be arranged on an embedding space based on the inter-word distance matrix. The inter-word distance matrix may be stored in a non-transitory computer memory.

In an example, the speech recognition apparatus may apply a multidimensional scaling (MDS) method to the inter-word distance matrix and may arrange, at one point on an N-dimensional embedding space, an embedding vector to which each word is mapped.

The MDS method may include measuring characteristics of objects and arranging the objects at points on a multidimensional space based on similarity between the objects using the measured characteristics. For example, the speech recognition apparatus may apply a "cmdscale" function to the inter-word distance matrix and convert elements of the inter-word distance matrix to coordinates on the embedding space.

The cmdscale function may refer to a function that receives the inter-word distance matrix and converts the elements of the received inter-word distance matrix to coordinates. The speech recognition apparatus may convert the elements to the coordinates on the embedding space by applying the cmdscale function to the inter-word distance matrix and arrange, on the embedding space, an embedding vector for which coordinates are set.

The speech recognition apparatus may arrange the phoneme sequences of all words in a language or all words in a set of vocabularies to be recognized on an N-dimensional embedding space using embedding vectors corresponding to the words. According to one example, the speech recognition apparatus may arrange the embedding vectors based on the phonetic distance between the words. The phonetic distance between the words may be determined based on a phonetic similarity between the words in the set of vocabularies. For example, the speech recognition apparatus may arrange the embedding vectors for words phonetically similar to one another to be positioned closely to one another.

As illustrated in FIGS. 1A and 1B, the speech recognition apparatus arranges words phonetically similar to one another, such as "write," "wrote," and "rewrite," for example, to be positioned closely to one another on the N-dimensional embedding space. Similarly, the speech recognition apparatus arranges words phonetically similar to one another, such as "love," "lived," and "live," for example, to be positioned closely to one another on the N-dimensional embedding space.

In an example, the speech recognition apparatus may receive a speech input from a user through a speech recognition sensor. For example, the speech recognition sensor may include a microphone, and the speech recognition apparatus may obtain a phoneme sequence from the received speech input.

The speech recognition apparatus may select an embedding vector arranged closest to the phoneme sequence obtained from the speech input among the plurality of embedding vectors arranged on the embedding space. The speech recognition apparatus may predict the speech input of the user based on a word corresponding to the selected embedding vector.

The speech recognition apparatus may increase training efficiency by arranging, in an identical dimension, a greater number of words corresponding to embedding vectors, in comparison to the 1-of-M method. The speech recognition apparatus may be pre-trained based on the phonetic distance between the words; thus, sufficient training efficiency may be obtained with a fewer number of iterative trainings, for example, an epoch training. In addition, the speech recognition apparatus may express a relationship between the words by arranging a great number of embedding vectors in one dimension based on the phonetic distance between the words.

Further, in adding or deleting a word, the speech recognition apparatus may reduce an amount of time used for training by newly adding an embedding vector to the multidimensional embedding space or deleting a previously arranged embedding vector from the multidimensional embedding space. For example, to add a new word, the speech recognition apparatus may adaptively respond to the new word to be added by arranging an embedding vector to be added at a proper position on a previously trained N-dimensional embedding space. Accordingly, the speech recognition apparatus may reduce an amount of time used for the training.

Figure 2:
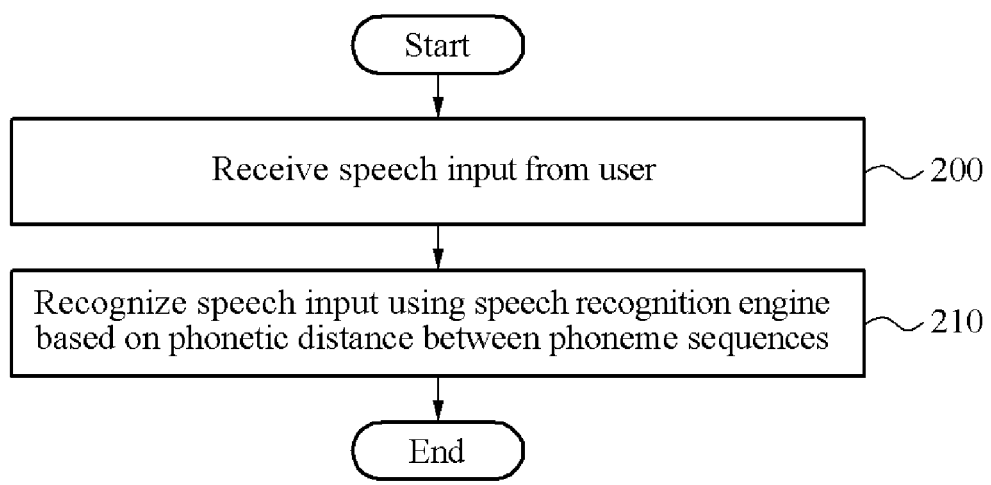
FIG. 2 is a flowchart illustrating an example of a method of recognizing a speech input using a speech recognition engine.

FIG. 2 is a flowchart illustrating an example of a method of recognizing a speech input of a user using a speech recognition engine.

Referring to FIG. 2, in 200, a speech recognition apparatus receives a speech input from a user. The speech recognition apparatus may include a user terminal and a speech recognition server. For example, the user terminal may be a smartphone, a portable terminal such as a personal digital assistant (PDA), a wearable device attachable to and detachable from a body of the user, and a terminal including various speech command systems.

The user terminal may receive the speech input through a speech interface. Alternatively, the speech recognition server may receive the speech input from the user terminal.

In 210, the speech recognition apparatus provides an accurate speech recognition service using the speech recognition engine.

In an example, the speech recognition apparatus may predict a phoneme sequence using the speech recognition engine. The speech recognition apparatus may arrange N-dimensional embedding vectors on an N-dimensional embedding space stored in the speech recognition engine. An embedding vector may be an indication of a word as a one dimensional point. The speech recognition apparatus may arrange embedding vectors to which words phonetically similar to one another are mapped to be closer to one another on the embedding space.

A phoneme sequence may be expressed based on pronunciation of a word. Thus, one word may be expressed as at least one embedding vector. For example, a phoneme sequence of "live" may be expressed as "[l ih v]," "[l ay f]," or "[l ay v]." Thus, "live" may be arranged as three embedding vectors on the N-dimensional embedding space. The speech recognition apparatus may arrange phoneme sequences of all words on the N-dimensional embedding space using embedding vectors.

A substitution probability between phonemes may be inversely proportional to a phonetic distance between the phonemes. When the substitution probability between the phonemes increases, the phonetic distance between the phonemes may decrease. The speech recognition apparatus may determine a phonetic distance between words based on the phonetic distance between the phonemes.

The speech recognition apparatus may arrange embedding vectors based on the phonetic distance between the words. Accordingly, the speech recognition apparatus may predict a word corresponding to a phoneme sequence using the embedding vectors.

The speech recognition apparatus may receive the speech input from the user through the speech interface. Thus, the speech recognition apparatus may obtain a phoneme sequence from the received speech input. For example, the phoneme sequence obtained by the speech recognition apparatus may be "[s ma r to]."

The speech recognition apparatus may select an embedding vector arranged closest to the obtained phoneme sequence among the embedding vectors in the embedding space. The speech recognition apparatus may predict a word corresponding to the selected embedding vector as the speech input. For example, the speech recognition apparatus may predict the speech input to correspond to "[s ma r t]." Thus, the speech recognition apparatus may determine the phoneme sequence of the speech input as corresponding to the word "smart" using the selected embedding vector.

In an example, the speech recognition server may recognize a speech command of a user based on a predicted word and transmit a result of the recognizing to the user terminal. The user terminal may perform processing in response to reception of the result and provide the user with a result of the processing. The result of the processing may be displayed on a display of the user terminal or output through a speaker of the user terminal.

In another example, the user terminal may recognize a speech command of a user based on a predicted word using the speech recognition engine, and perform processing in response to the recognized speech command. Thus, the user terminal may output a result of the processing through the speaker or display the result of the processing through the display.

A speech recognition method may be used for various services. For example, the speech recognition method may be used for a speech based personal assistant service provided by a smartphone. The speech recognition method may also be used for a service requiring speech dictation, for example, the transmission of messages and preparation of minutes. In addition, the speech recognition method may be used for a speech recognition based command system provided by a vehicle, a smart TV, and the like.

Figure 3:
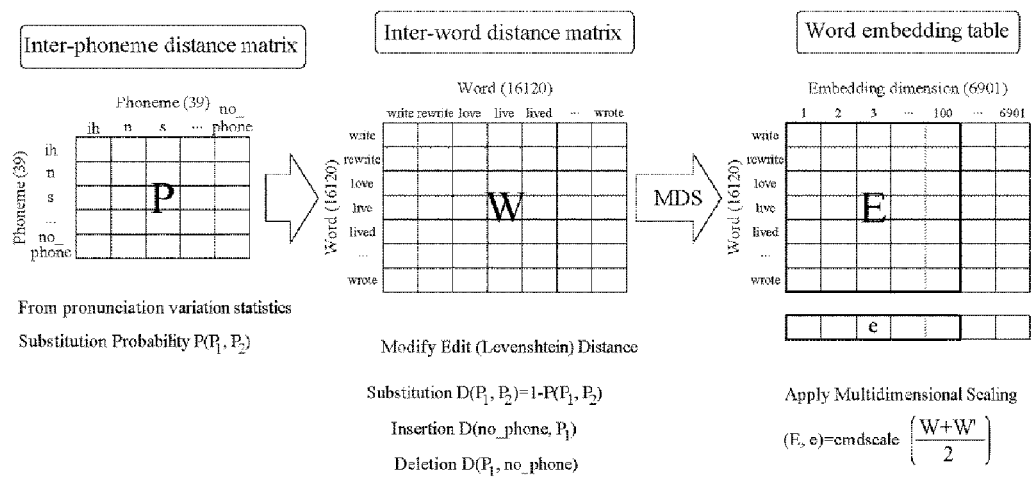
FIG. 3 is a diagram illustrating an example of a method of arranging all words on an embedding space as embedding vectors to generate a speech recognition engine.

FIG. 3 is a diagram illustrating an example of a method of arranging all words on an N-dimensional embedding space as N-dimensional embedding vectors to generate a speech recognition engine.

A method of obtaining a phonetic distance between phonemes based on a substitution probability between the phonemes will be described hereinafter.

Referring to FIG. 3, a speech recognition apparatus calculates a substitution probability between phonemes of each word. The speech recognition apparatus compares phoneme sequences of words. Thus, the speech recognition apparatus may compare the phoneme sequences of all the words and calculate the substitution probability between the phonemes based on a result of the comparing.

The substitution probability between the phonemes may indicate a probability that phonemes included in a word are modified when the word is pronounced. The substitution probability between the phonemes may be expressed as Equation 1. The substitution probability between the phonemes may be determined based on a frequency of pronunciation modifications.

$$\text{Substituion Probability } P(P_1, P_2) \qquad \text{[Equation 1]}$$

In Equation 1, "$P_1$" and "$P_2$" denote probabilities that a word is pronounced based on a phoneme sequence. For example, a probability that a word "live" is pronounced as "[l ih v]" may be 0.4 and as "[l ay v]" may be 0.2.

The speech recognition apparatus may calculate the substitution probability between the phonemes of the phoneme sequences. For example, the speech recognition apparatus may calculate a substitution probability between phonemes "[ih]" and "[ay]" of phoneme sequences "[l ih v]" and "[l ay v]" of "live." The speech recognition apparatus may determine a phonetic distance between the phonemes based on the substitution probability between the phonemes.

In an example, the speech recognition apparatus may determine an inverse number of the substitution probability between the phonemes to be the phonetic distance between the phonemes. In another example, the speech recognition apparatus may determine the phonetic distance between the phonemes based on Equation 2.

$$D(P_1, P_2) = 1 - P(P_1, P_2) \qquad \text{[Equation 2]}$$

As indicated in Equation 2, when the substitution probability between the phonemes increases, the phonetic distance between the phonemes may decrease. That is, the phonetic distance between the phonemes may be inversely proportional to the substitution probability between the phonemes.

The speech recognition apparatus may calculate an inter-phoneme distance matrix based on the determined phonetic distance between the phonemes. In an example, the speech recognition apparatus may express, as Equation 3, the inter-phoneme distance matrix calculated based on the substitution probability between the phonemes. The inter-phoneme distance matrix may refer to a matrix indicating a phonetic distance or a substitution probability between a phoneme and another phoneme.

An example of a method of obtaining the inter-word distance matrix based on the phonetic distance between the phonemes will be described hereinafter.

The speech recognition apparatus may obtain a distance matrix between all words based on the inter-phoneme distance matrix. The inter-word distance matrix may refer to a matrix indicating a phonetic distance between the words. The phonetic distance between the words may indicate a phonetic distance between phoneme sequences. The phonetic distance between the phoneme sequences may be determined based on the phonetic distance between phonemes.

In an example, the speech recognition apparatus may obtain the inter-word distance matrix using a Levenshtein distance. The Levenshtein distance may be used to measure a number of modifications required to change one word to another word. For example, the speech recognition apparatus may calculate the phonetic distance between the words by setting a unit distance per letter to be "1."

In another example, the speech recognition apparatus may calculate the phonetic distance between the words by setting a unit distance per character to be the phonetic distance between the phonemes. The speech recognition apparatus may calculate the phonetic distance between the words using a distance calculation method modified from the Levenshtein distance. Thus, the speech recognition apparatus may more accurately calculate the phonetic distance between the words. However, the method of obtaining the phonetic distance between the words may not be limited to examples described in the foregoing, and various methods may be used to obtain the phonetic distance between the words.

The speech recognition apparatus may arrange an embedding vector based on a probability that a character string is deleted from or added to a word. In an example, the speech recognition apparatus may calculate a phonetic distance between character strings deleted from a word or character strings added to the word. For example, when a user pronounces "smart phone," the user may pronounce "smart phone" with "phone" deleted therefrom. The speech recognition apparatus may then determine that "phone" is most likely to be deleted and calculate a therefrom distance between the words to be short. Thus, although the user provides a speech command "smart," the speech recognition apparatus may predict "smart phone" to be a speech command desired to be transmitted.

A method of arranging embedding vectors on an N-dimensional embedding space based on the inter-word distance matrix will be described hereinafter.

In an example, the speech recognition apparatus may arrange each word on the N-dimensional embedding space as a single point embedding vector by applying a multidimensional scaling method to the inter-word distance matrix.

The multidimensional scaling method may include measuring characteristics of objects and arranging the objects as points on a multidimensional space based on similarity between the objects using the measured characteristics. The speech recognition apparatus may convert elements of the inter-word distance matrix to N-dimensional embedding vectors using the multidimensional scaling method. Thus, as illustrated in FIG. 3, the speech recognition apparatus may arrange the embedding vectors on the N-dimensional embedding space. The multidimensional scaling method may be expressed as Equation 3.

$$(E, e] = cmdscale\left(\frac{W + W'}{2}\right)$$ [Equation 3]

In Equation 3, a cmdscale function may refer to a function that receives an inter-word distance matrix and restores coordinates. The speech recognition apparatus may calculate a phonetic distance between all words using the inter-word distance matrix, and convert a result of applying the cmdscale function to the inter-word distance matrix to coordinates on the embedding space.

Thus, the speech recognition apparatus may arrange, on the N-dimensional embedding space, embedding vectors to which phoneme sequences of all the words are to be mapped. Identical words may be pronounced differently based on meanings. In additional, identical words may be pronounced differently based on accents of users. The speech recognition apparatus may arrange the embedding vectors by mapping the phoneme sequences of all the words to the embedding vectors. Accordingly, the speech recognition apparatus may more accurately recognize a speech command of a user.

Herein, the expression "all the words" may refer to vocabularies of known words in a language, or an entire set of words for an application or purpose. For example, a speech recognition engine for a speech recognition apparatus that uses speech recognition for recognizing user commands may include words that are relevant for user commands, and may or may not recognition other words. On the other hand, a speech recognition engine for a speech recognition apparatus that recognizes spoken English and convert the speech input to a text may recognize all or most vocabularies of known words in English language. The arrangement of the words provides a speech recognition engine in which the embedding vectors are arranged on the embedding space.

Figure 4:
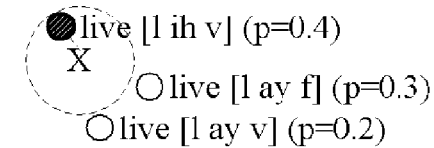
FIG. 4 is a diagram illustrating an example of a method of improving accuracy in recognizing a speech command.

FIG. 4 is a diagram illustrating an example of a method of improving accuracy in recognizing a speech command.

A speech recognition apparatus may arrange an embedding vector at one point on an N-dimensional embedding space based on a phonetic distance between words. Referring to FIG. 4, respective phoneme sequences of "lived," "live," and "live" are "[l ih v]," "[l ay f]," and "[l ay v]." Each word may include a plurality of phoneme sequences. For example, a probability that "live" is pronounced "[l ih v]" may be 0.4, "[l ay f]" may be 0.3, and "[l ay v]" may be 0.2. As illustrated in FIG. 4, the speech recognition apparatus may arrange an embedding vector to which a phoneme sequence "[l ih v]," "[l ay f]," or "[l ay v]" is mapped on the N-dimensional embedding space.

For example, as illustrated in FIG. 4, when a phoneme sequence obtained from a speech command of a user is positioned on an X-coordinate on the N-dimensional embedding space, the speech recognition apparatus may select an embedding vector to which a phoneme sequence "[l ih v]" closest to the X-coordinate is mapped. Thus, the speech recognition apparatus may predict a word "live" corresponding to "[l ih v]." Accordingly, the speech recognition apparatus may more accurately predict the speech command of the user.

Figure 5:
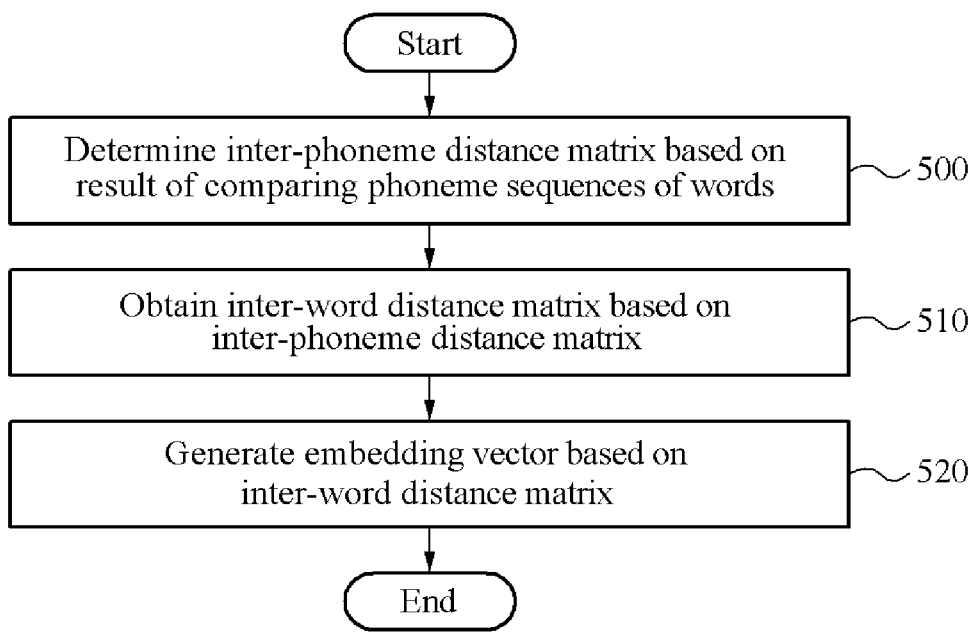
FIG. 5 is a flowchart illustrating an example of a method of generating embedding vectors based on phonetic distances between words.

FIG. 5 is a flowchart illustrating an example of a method of generating an embedding vector based on phonetic distances between words.

Referring to FIG. 5, in 500, a speech recognition apparatus compares phoneme sequences of all words in a set of vocabularies. The set may include all known vocabularies of a given language or a subset of vocabularies likely to be used in a user command, for example. Among the words in the set of vocabularies, some identical words may be pronounced differently based on meanings. In addition, a word may be pronounced differently based on an accent of a user. Thus, the speech recognition apparatus may compare the phoneme sequences of the words, determine a phonetic similarity, and determine an inter-phoneme distance matrix based on a result of the determining.

The inter-phoneme distance matrix may refer to a matrix indicating a phonetic distance between phonemes. The inter-phoneme distance matrix may be determined based on a substitution probability between the phonemes. A high substitution probability between the phonemes may indicate a high probability that the phonemes are phonetically modified. The substitution probability between the phonemes may be inversely proportional to the phonetic distance between the phonemes.

In 510, the speech recognition apparatus obtains an inter-word distance matrix based on the inter-phoneme distance matrix. The inter-word distance matrix may refer to a matrix indicating a phonetic distance between the words. The phonetic distance between the words may be determined based on a phonetic distance between phoneme sequences of the words. For example, when a substitution probability between phonemes included in a phoneme sequence increases, the phonetic distance between the words may decrease.

In an example, the speech recognition apparatus may calculate the phonetic distance between the words based on a Levenshtein distance. The speech recognition apparatus may more accurately calculate the phonetic distance between the words using the phonetic distance between the phonemes as a unit distance per character. However, a method of calculating the phonetic distance between the words may not be limited thereto and various methods may be used to calculate the phonetic distance between the words.

In 520, the speech recognition apparatus generates an embedding vector to be arranged on an embedding space based on the inter-word distance matrix. The embedding vector may refer to a vector to which a phoneme sequence of a word is mapped.

In an example, the speech recognition apparatus may convert the inter-word distance matrix to embedding vectors using a multidimensional scaling method, and may arrange the embedding vectors obtained from the converting of the inter-word distance matrix on an N-dimensional embedding space. However, a method of arranging the embedding vectors on the N-dimensional embedding space is not limited thereto; various other methods may be used to arrange the embedding vectors on a multidimensional space.

The speech recognition apparatus may select an embedding vector closest to a phoneme sequence obtained from a speech command of a user from among embedding vectors arranged on the N-dimensional embedding space. The speech recognition apparatus may predict the speech command of the user based on a word corresponding to the phoneme sequence mapped to the selected embedding vector. Thus, the speech recognition apparatus may more accurately predict a speech command of the user even if pronunciation of the word is modified due to accents of different users.

The speech recognition apparatus may perform processing in response to the recognized speech command. For example, the speech recognition apparatus may perform the processing in response to the speech command of the user using a processor and provide a result of the processing.

Alternatively, the speech recognition apparatus may transmit the recognized speech command to a user terminal. Thus, the user terminal may perform the processing in response to the speech command of the user and provide a result of the processing.

Figure 6:
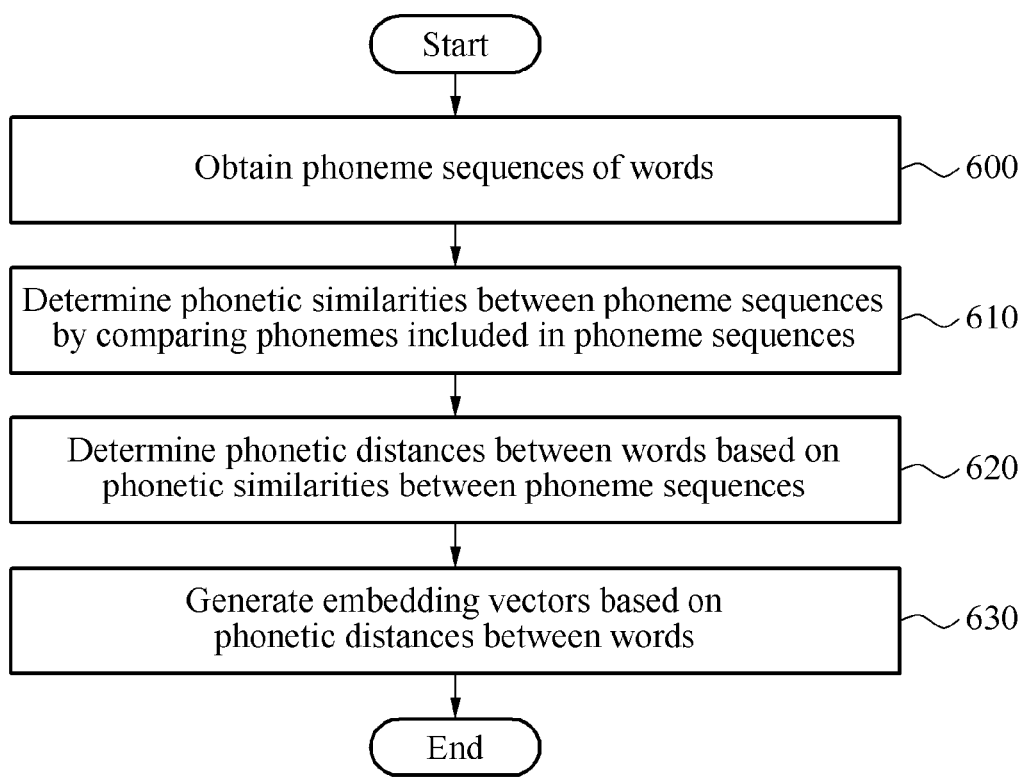
FIG. 6 is a flowchart illustrating an example of a method of generating a speech recognition engine providing a speech recognition result based on phonetic distances between phoneme sequences of words.

FIG. 6 is a flowchart illustrating an example of a method of generating a speech recognition engine providing a speech recognition result based on a phonetic distance between phoneme sequences.

A speech recognition engine generating apparatus to be described hereinafter may refer to an apparatus that is capable of generating a speech recognition engine. The speech recognition engine generating apparatus may be disposed in a speech recognition apparatus. Alternatively, the speech recognition engine generating apparatus may be disposed separately from the speech recognition apparatus.

Referring to FIG. 6, in 600, the speech recognition engine generating apparatus obtains respective phoneme sequences of words in a set of vocabularies. A phoneme sequence may refer to an arrangement of a series of phonemes included in a word. The phoneme sequence may be expressed based on a pronunciation of the word. For example, in the event one word is pronounced in various ways, the speech recognition engine generating apparatus may obtain a plurality of phoneme sequences associated with the word.

The words for which phoneme sequences are obtained may be determined based on the purpose of the speech recognition engine. For example, to recognize all words of a given language, the phoneme sequences of all or substantially all vocabularies in the language may be obtained. To generate a speech recognition engine for a speech command user interface, phoneme sequences of at least all words that may be used to recognize the user commands may be obtained.

In 610, the speech recognition engine generating apparatus compares phonemes included in the phoneme sequences and determines phonetic similarities between the to phoneme sequences. The phonetic similarity may refer to a degree of similarity in pronunciation. In an example, the speech recognition engine generating apparatus may compare the obtained phoneme sequences and may calculate a substitution probability between the phonemes based on a result of the comparing. The substitution probability between the phonemes may refer to a probability that phonemes included in a word are modified when the user pronounces the word.

The speech recognition engine generating apparatus determines a phonetic similarity between phoneme sequences based on the substitution probability between the phonemes of the phoneme sequences. In an example, when the substitution probability between the phonemes increases, the phonetic similarity between the phoneme sequences may increase. Thus, the speech recognition engine generating apparatus may compare the phoneme sequences of the words and determine a relative relationship between the phoneme sequences.

After the phonetic similarities between phoneme sequences are determined, in 620, the speech recognition engine generating apparatus determines phonetic distances between the words based on the phonetic similarities between the phoneme sequences. For example, the speech recognition engine generating apparatus may determine the phonetic distances between the words based on the phonetic similarities between the phoneme sequences. The speech recognition engine generating apparatus may express the phonetic distances between the words as a matrix. A matrix that indicates phonetic distances between words may be referred to as an inter-word distance matrix.

In 630, the speech recognition engine generating apparatus generates embedding vectors based on the phonetic distances between the words. In an example, the speech recognition engine generating apparatus may arrange elements of the inter-word distance matrix indicating the phonetic distances between the words on a multidimensional embedding space. The speech recognition engine generating apparatus may arrange vectors to which the elements of the inter-word distance matrix are mapped on an N-dimensional embedding space by applying a multidimensional scaling method to the inter-word distance matrix. The vectors arranged on the N-dimensional embedding space may be referred to as embedding vectors. The speech recognition engine generating apparatus may set coordinates for each element of the inter-word distance matrix by applying the multidimensional scaling method. Thus, the speech recognition engine generating apparatus may generate the speech recognition engine in which the embedding vectors are arranged on the N-dimensional embedding space.

Figure 7:
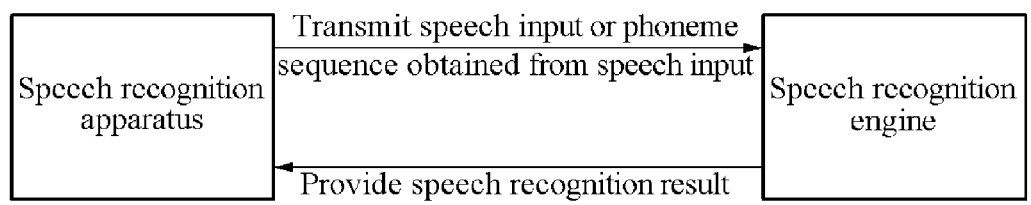
FIG. 7 is a diagram illustrating a relationship between an example of a speech recognition apparatus and an example of a speech recognition engine.

FIG. 7 is a diagram illustrating a relationship between an example of a speech recognition apparatus and an example of a speech recognition engine.

Referring to FIG. 7, both the speech recognition apparatus and the speech recognition engine may be disposed in an identical apparatus, or designed as a single module. Alternatively, the speech recognition engine may be disposed in an apparatus separate from the speech recognition apparatus. In yet another example, the speech recognition apparatus may be disposed in a separate apparatus from the speech recognition engine such that the speech recognition apparatus may provide a speech recognition service by interworking with the speech recognition engine.

Referring to FIG. 7, the speech recognition apparatus receives a speech input from a user through a speech interface. In one example, the speech recognition apparatus may transmit a phoneme sequence obtained from the speech input.

In another example, the speech recognition apparatus may transmit the speech input to the speech recognition engine. The speech recognition engine may then obtain the phoneme sequence from the speech input.

A method of performing speech recognition by the speech recognition engine based on the phoneme sequence obtained by the speech recognition apparatus or the phoneme sequence obtained by the speech recognition engine will be described.

The speech recognition engine may determine a phonetic distance of the input phoneme sequence. The phonetic distance may be determined based on phonetic similarity. For example, in the case that the phonetic similarity between two phoneme sequences is high, the phonetic distance of corresponding words may be determined to be low; that is, the phonetic similarity between two words and the phonetic distance between the two words may have an inverse or opposite relationship. The phonetic distance between two phoneme sequences may indicate a phonetic distance between two words with the corresponding phoneme sequences.

In an example, the speech recognition engine may arrange embedding vectors on an N-dimensional embedding space based on the phonetic distance between the phoneme sequences. An embedding vector may refer to a vector to which a phoneme sequence is mapped. The speech recognition engine may compare the phoneme sequences of the words and set the phonetic distance based on the phonetic similarity. For example, in the case that the phonetic similarity between the phoneme sequences is high, the speech recognition engine may set the phonetic distance between the phoneme sequences to be short; that is, the phonetic similarity and the phonetic distance may have an inverse relationship or an opposite relationship. Thus, the speech recognition engine may generate the N-dimensional embedding space on which the embedding vectors are arranged.

The speech recognition engine may compare the phoneme sequences mapped to the embedding vectors on the N-dimensional embedding space to the input phoneme sequences, and select an embedding vector positioned closest in the phonetic distance between the input phoneme sequences.

The speech recognition engine may output a speech recognition result based on the phoneme sequences mapped to the embedding vectors. Thus, the speech recognition engine may transmit the speech recognition result to the speech recognition apparatus. The speech recognition apparatus may then perform processing in response to the speech recognition result.

The speech recognition apparatus may execute a service desired by the user based on the speech recognition result. For example, the speech recognition apparatus may execute various application services using a speech recognition function, such as a dialog engine, a speech command, a transmission of a short message service (SMS) message, a dictation service, or a real-time interpretation.

Figure 8:
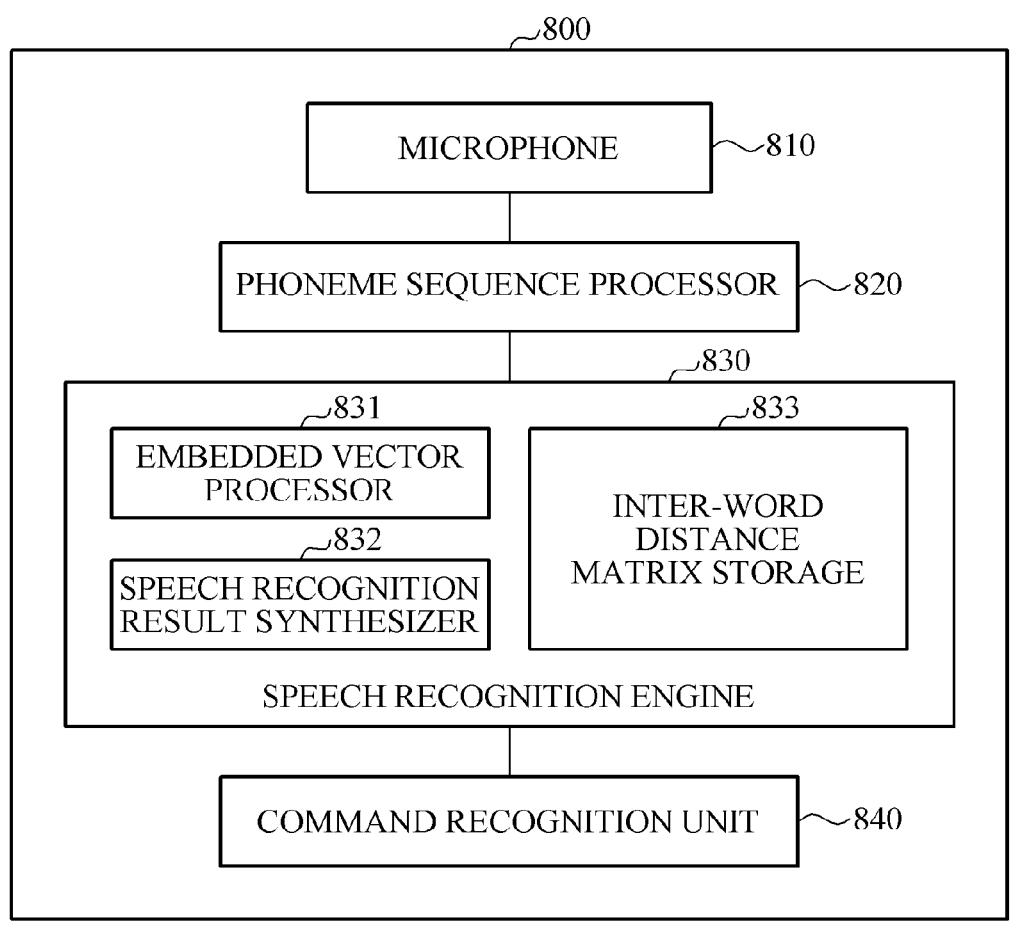
FIG. 8 is a diagram illustrating an example of a speech recognition apparatus for recognizing a speech input and carrying out a speech command.

FIG. 8 is a diagram illustrating an example of a speech recognition apparatus. The speech recognition apparatus may be used to detect a user command from a speech input.

Referring to FIG. 8, the speech recognition apparatus 800 includes a microphone 810, a phoneme sequence processor 820, a speech recognition engine 830 and a command recognition unit 840. According to one example, the speech recognition apparatus 800 may be a mobile terminal, such as a smart phone, a personal digital assistant (PDA), a wearable device attachable to and detachable from a body of the user, a navigation device and the like, or a fixed terminal such as a smart television; however, the speech recognition apparatus 800 is not limited thereto.

A speech input from a user may be detected by the microphone 810, and the speech input may be transmitted to the phoneme sequence processor 820. The speech input may include a user command for operating the speech recognition apparatus 800 to provide a service. The phoneme sequence processor 820 may include a computer processor. The phoneme sequence processor 820 may parse the sound data contained in the speech input into a phoneme sequence.

The phoneme sequence may be transmitted to the speech recognition engine 830. The speech recognition engine 830 includes an embedded vector processor 831, a speech recognition result synthesizer 832, and an inter-word distance matrix storage 833. The embedded vector processor 831 may select an embedding vector corresponding to the phoneme sequence detected from the speech input from among a plurality of embedding vectors arranged in an embedding space. The inter-word distance matrix storage 833 may store an inter-word distance matrix obtained by a training performed in advance in a non-transitory computer memory. The inter-word distance matrix may be used to populate the embedding space with embedding vectors. Based on the selected embedding vector, the speech recognition result synthesizer 832 may synthesize a speech recognition result. The speech recognition result may include a sequence of words recognized from the speech input.

For example, the speech recognition engine 830 and the speech recognition apparatus 800 may be disposed in an identical apparatus as to FIG. 8. In another example, the speech recognition engine 830 may be disposed in another apparatus separate from the speech recognition apparatus 800.

The speech recognition result may be transmitted to a command recognition unit 840 within the speech recognition apparatus 800. The command recognition unit 840 may analyze the speech recognition result to determine whether a user command is present in the words recognized from the speech input. The command recognition unit 840 may include a processor. In response to determining that a user command is present in the speech input, the speech recognition apparatus 800 may execute a service desired by the user based on the recognized user command. For example, the speech recognition apparatus may execute an application based service such as making a call, taking a picture, navigating to an address or sending an e-mail. Thus, in this example, it is possible to provide a speech command interface by using the speech recognition apparatus 800.

For example, each of the phoneme sequence processor 820, the speech recognition engine 830 and the command recognition unit 840 may have an independent processor. In another example, the phoneme sequence processor 820, the speech recognition engine 830 and the command recognition unit 840 may have an identical processor.

While an example in which the speech recognition engine 830 is provided within the speech recognition apparatus 800 is described in FIG. 8, the present description is not limited thereto. The description of various examples of speech recognition apparatuses and speech recognition engines provided with reference to FIGS. 1B through 7 applies to the speech recognition apparatus illustrated in FIG. 8.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of speech recognition, the method comprising:
   receiving a speech input;
   transmitting the speech input to a speech recognition engine; and
   receiving a speech recognition result from the speech recognition engine,
   wherein the speech recognition engine is configured to
      obtain a phoneme sequence from the speech input,
      identify an embedding vector representative of a phoneme sequence that is closest in a phonetic distance to the obtained phoneme sequence among embedding vectors arranged on an N-dimensional embedding space, and
      determine, based on the identified embedding vector, the speech recognition result based on a previous phoneme sequence mapping into the N-dimensional embedding space corresponding to the identified embedding vector,
   wherein the identifying of the embedding vector includes identifying the embedding vector from the obtained phoneme sequence using a recognition model that is trained-based on probabilities of respective phonemes of phoneme sequences being substituted by different phonemes when pronounced, and
   wherein embedding vectors to which words phonetically similar to one another are mapped among the embedding vectors in the N-dimensional embedding space are positioned closer to one another than other embedding vectors on the N-dimensional embedding space.

2. The method of claim 1, wherein the speech recognition engine comprises an inter-word distance matrix indicating phonetic distances between words determined based on phonetic similarities between phoneme sequences of the words, and
   wherein the determining of the speech recognition result includes using the inter-word distance matrix to determine the speech recognition result from the identified embedding vector.

3. The method of claim 2, wherein each of the respective embedding vectors are arranged on the N-dimensional embedding space based on a multidimensional scaling method having been applied to the inter-word distance matrix.

4. The method of claim 1, wherein the recognition model is trained based on phonetic distances decreasing as the probabilities of the respective phonemes of the phoneme sequences being substituted by the different phoneme increase.

5. A processor implemented method of generating a speech recognition engine, the method comprising:
comparing phonemes comprised in training phoneme sequences for words;
calculating a substitution probability between each phoneme of the phonemes and all other phonemes of the phonemes;
determining phonetic similarities between the training phoneme sequences based on the substitution probability calculated for each phoneme of the training phoneme sequences;
calculating phonetic distances between the words based on the determined phonetic similarities between the training phoneme sequences;
generating embedding vectors by implementing a multi-dimensional scaling algorithm to convert the calculated phonetic distances between the words to the embedding vectors
arranged on an N-dimensional embedding space; and
generating the recognition engine by training, using the generated embedding vectors as training outputs and the training phoneme sequences as training inputs, a recognition model to identify an embedding vector representative of a phoneme sequence that is closest in a phonetic distance to an input phoneme sequence among other positions in the N-dimensional embedding space representative of other phoneme sequences,
wherein the training of the recognition model includes repeatedly applying an input training phoneme sequence by the recognition model to identify respective resulting embedding vectors until the recognition model is trained to generate the identified embedding vector representative of a word recognition result for the input phoneme sequence.

6. The method of claim 5, wherein the calculating of phonetic distances comprises assigning values to the phonetic distances such that, when a phonetic similarity between the training phoneme sequences is large, a phonetic distance between words corresponding to the training phoneme sequences is small.

7. The method of claim 5, wherein the determining comprises:
determining the phonetic similarities between the training phoneme sequences to be high when the calculated substitution probability between the phonemes is high.

8. The method of claim 5,
further comprising storing of the calculated phonetic distances as an inter-word distance matrix indicating the calculated phonetic distances, and
wherein the generating of the embedding vectors comprises generating an embedding vector by applying the multidimensional scaling algorithm to the inter-word distance matrix.

9. The method of claim 5, wherein
the determining comprises calculating a distance between phonemes based on the substitution probability calculated for each phoneme, and
the calculating of the phonetic distances between the words comprises calculating a phonetic distance between words based on the calculated distance between the phonemes.

10. The method of claim 5, wherein the substitution probability is determined based on a frequency of pronunciation modifications of a corresponding phoneme.

11. A method of speech recognition, the method comprising:
receiving a speech input;
obtaining a phoneme sequence from the speech input;
selecting an embedding vector representative of a phoneme sequence that is closest in a phonetic distance to the phoneme sequence among embedding vectors arranged on an N-dimensional embedding space; and
identifying a word of the speech input based on the selected embedding vector,
wherein embedding vectors to which words phonetically similar to one another are mapped among the embedding vectors in the N-dimensional embedding space are positioned closer to one another than other embedding vectors on the N-dimensional embedding space, and
wherein the selecting of the embedding vector includes selecting the embedding vector using a recognition model that is trained using training phoneme data and trained to identify corresponding embedding vectors representing dimensional scale reductions of inter-word distance information.

12. The method of claim 11, wherein the embedding vectors are arranged on the N-dimensional embedding space dependent on phonetic distances between phoneme sequences, the phonetic distances being dependent on phonetic similarities between phonemes of the phoneme sequences.

13. The method of claim 11,
wherein the identifying of the word includes using an inter-word distance matrix including the inter-word distance information to identify the word from the selected embedding vector, the inter-word distance information phonetic distances between the words.

14. An apparatus comprising:
a microphone configured to receive a speech input;
a processor configured to
obtain a phoneme sequence from the speech input,
identify an embedding vector representative of a phoneme sequence that is closest in the phonetic distance to the obtained phoneme sequence among embedding vectors arranged on an N-dimensional embedding space, and
determine, based on the identified embedding vector, a speech recognition result based on a previous phoneme sequence mapping into the N-dimensional embedding space corresponding to the identified embedding vector,
wherein the identifying of the embedding vector includes identifying the embedding vector from the obtained phoneme sequence using a recognition model that is trained based on probabilities of respective phonemes of phoneme sequences being substituted by different phonemes when pronounced, and
wherein embedding vectors to which words phonetically similar to one another are mapped among the embedding vectors in the N-dimensional embedding space are positioned closer to one another than other embedding vectors on the N-dimensional embedding space.

15. The apparatus of claim 14, wherein the processor is further configured to provide a speech command interface based on the speech recognition result.

16. The apparatus of claim 14, wherein the processor comprises an inter-word distance matrix indicating phonetic distances between words stored in a memory and the processor determines the speech recognition result using the inter-word distance matrix and the selected embedding vector.

17. The apparatus of claim 14,
wherein the processor is further configured to parse the speech input to obtain the phoneme sequence in a vector form.

18. A speech recognition engine generator, comprising:
a processor; and
a memory having instructions stored thereon executed by the at least one processor to perform:
comparing phonemes comprised in training phoneme sequences of words;
calculating a substitution probability between each phoneme of the phonemes and all other phonemes of the phonemes;
determining phonetic similarities between the training phoneme sequences based on the substitution probability calculated for each phoneme of the training phoneme sequences;
calculating phonetic distances between the words based on the determined phonetic similarities between the training phoneme sequences; and
generating embedding vectors by implementing a multidimensional scaling algorithm to convert the calculated phonetic distances between the words to the embedding vectors arranged on an N-dimensional embedding space; and
generating the recognition engine by training, using the generated embedding vectors, a recognition model to identify an embedding vector representative of a phoneme sequence that is closest in a phonetic distance to an input phoneme sequence among other positions in the N-dimensional embedding space representative of other phoneme sequences,
wherein the training of the recognition model includes repeatedly applying an input training phoneme sequence by the recognition model to identify respective resulting embedding vectors until the recognition model is trained to generate the identified embedding vector representative of a word recognition result for the input phoneme sequence.

19. The speech recognition engine generator of claim 18,
further comprising storing the calculated phonetic distances as an inter-word distance matrix indicating the calculated phonetic distances, and
wherein the generating of the embedding vectors comprises generating an embedding vector by applying the multidimensional scaling algorithm to the inter-word distance matrix.

* * * * *